April 15, 1930. B. T. ANDREN 1,754,926
CROSSBAR FOR AUTOMOBILE FRAMES
Original Filed Oct. 22, 1927  2 Sheets-Sheet 1
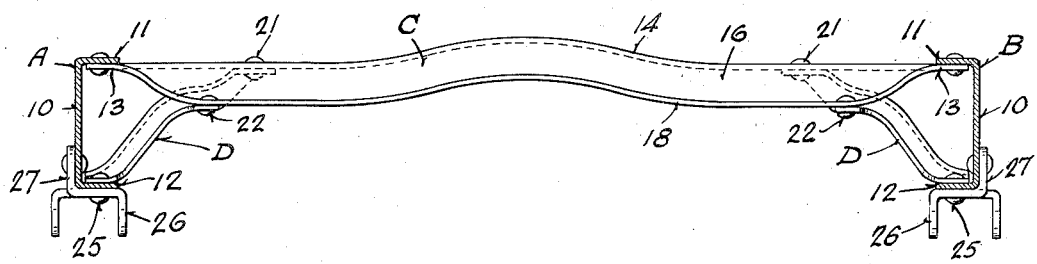
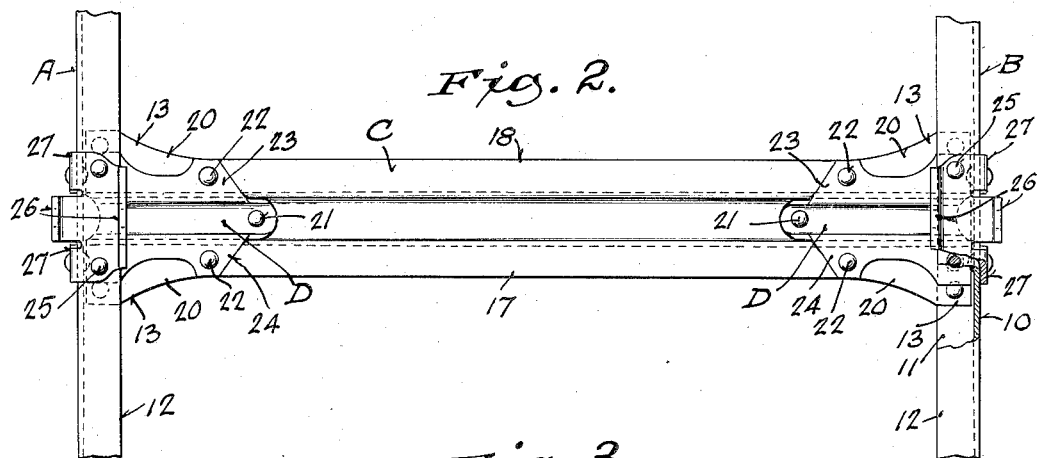
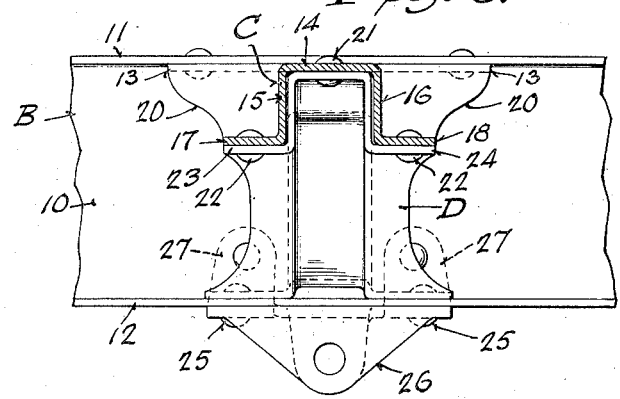
INVENTOR.
BIRGER TORVALD ANDREN April 15, 1930.  B. T. ANDREN  1,754,926
CROSSBAR FOR AUTOMOBILE FRAMES
Original Filed Oct. 22. 1927  2 Sheets-Sheet 2
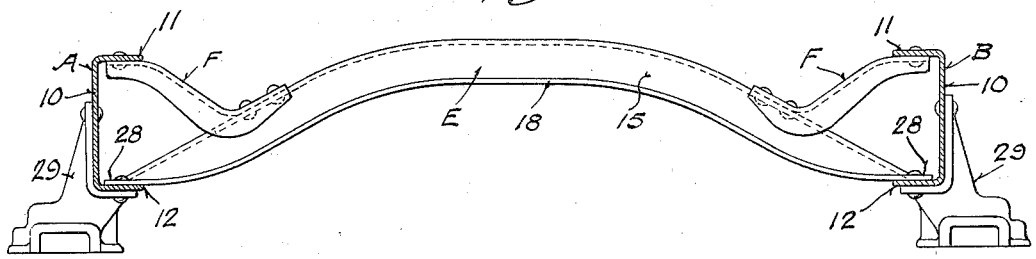
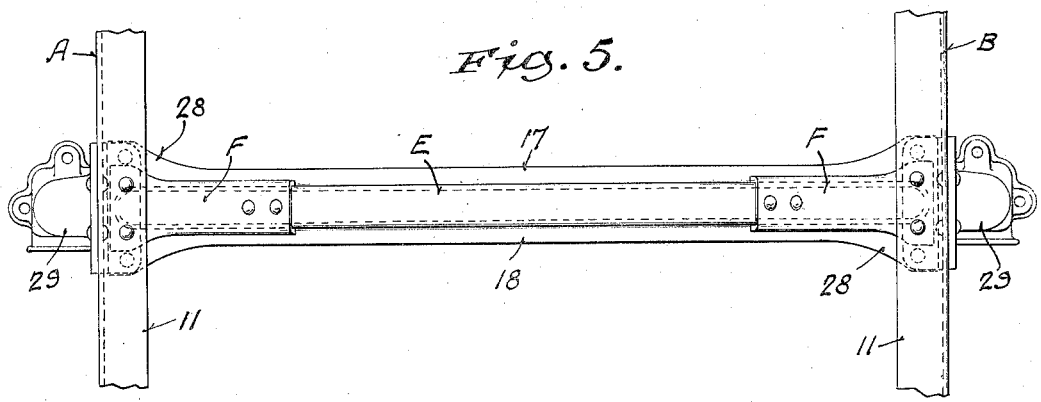
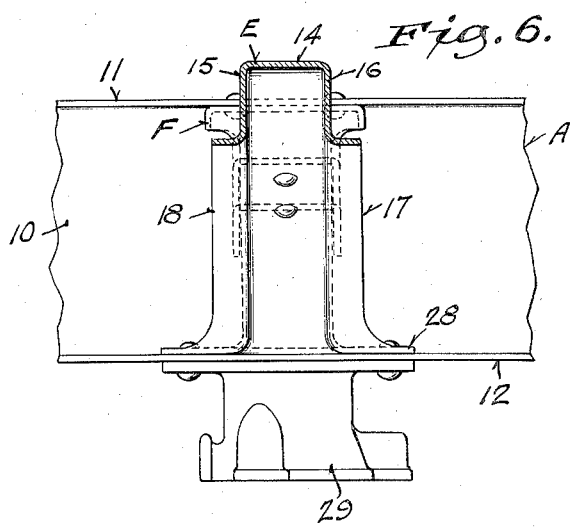
WITNESS:
INVENTOR.
BIRGER TORVALD ANDREN
BY
ATTORNEYS.

Patented Apr. 15, 1930

1,754,926

UNITED STATES PATENT OFFICE

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK

CROSSBAR FOR AUTOMOBILE FRAMES

Application filed October 22, 1927, Serial No. 227,888. Renewed March 5, 1929.

My invention relates to automobile or other vehicle frames. It resides in an improved construction which endows the frame with a greater degree of stability, and reduces in a considerable measure the strain upon the connected parts, by securing a wider distribution of the points of stress imposed on such connections in the operation of the vehicle in which the frame is incorporated.

The invention also resides in a construction of a drawn cross bar of irregular contour which is produced from a strip of sheet metal of uniform width, the entire strip being used in the production of the cross bar with integral gussets, so that the usual waste of marginal parts in contouring the blank for the shaped bar is avoided, and the production of scrap wholly eliminated.

The invention further resides in a novel manner of attaching the cross bars to the channel side bars of an automobile frame. Each of said cross bars preferably comprises an intermediate channel section, and end sections in the form of integral gussets, the gusset at each end being adapted to connect with one flange of the adjacent channel side bar. The opposite flange of each channel side bar is adapted to be connected to the channel sections of the cross bar by means of a brace.

The production of the new form of cross bar with integral gussets at its ends, and the use of the connecting braces in the manner stated, avoids the former requirement that the ends of the cross bar be wide enough to bridge the space between the two flanges of the side bar, and thereby a considerable economy in the amount of sheet metal necessary to the formation of the cross bar is effected.

Other features residing in the invention will now be described, and the novelty thereof will be pointed out in the appended claims.

In the accompanying drawings:

Figure 1 is a view in section transversely of the frame of an automobile, showing in side elevation one form of the improved cross bar, together with the braces used in conjunction therewith, and spring hangers having connection with the side bars through the means employed to attach the free ends of the braces to the side bars.

Fig. 2 is an inverted plan view of the construction shown in Fig. 1, the view being broken out at the right, to show details of the construction.

Fig. 3 is an enlarged sectional view transversely of the cross bar, looking toward the side bar at the right side of the frame.

Fig. 4 is a view similar to Fig. 1, showing another form in which my invention has been embodied.

Fig. 5 is a plan view of the construction in Fig. 4.

Fig. 6 is a view similar to Fig. 3, looking to the left of Fig. 4.

In the drawings, Figs. 1 to 3, the letters A and B indicate the oppositely arranged side bars of an automobile or other vehicle frame, such side bars being formed as channels drawn from sheet metal, the channels being composed of a vertically extending web 10 and inwardly extending flanges 11 and 12 at the longitudinal edges thereof, as is usual in automobile frames as now made.

The letter C designates a cross bar drawn from a rectangular strip of metal, the width of the strip being exemplified by that of the integral wide and flat gussets 13 at the ends thereof, the material of the strip being shaped in the drawing operation so as to form, when positioned between the side bars, an inverted channel member having a top or bridge 14, from which depends generally parallel sides 15 and 16, provided at their lower edges with outwardly extending flanges 17 and 18, respectively. As before stated, the gussets 13 are flat, and exist in the full width of the strip, which, intermediate such portions, is drawn to produce the narrower channel section described. The sides 15 and 16 are parallel and of even width for nearly the whole of the length of the cross bar, and the outwardly extending flanges 17 and 18 are of uniform width for a greater portion of their length. The formation of the channel at the ends of the cross bar C is gradual and of increasing depth, so that the gussets 13 and the outwardly extending flanges 17 and 18 are connected by tapering portions 20, which tapering portions, starting from the gussets, are gradually merged into the cross sectional construction shown in Fig. 3.

The gussets 13 at the ends of the cross bar are attached by rivets, or otherwise secured, to the upper flanges 11 of the opposite side bars A and B, the points of attachment being permitted to have a considerable degree of separation from each other, by reason of the width of the said gussets, so as to restrain the frame from longitudinal racking.

Braces D, drawn from sheet metal and having a channel form in cross section, are adapted to be fitted at one end closely in the channel of the cross bar C and to interlock therewith, one such brace being located at each end of the cross bar and secured thereto by rivets 21, or otherwise, passed through the top or bridge 14 of the cross bar and the corresponding part of the inner end of the underlying brace, and by rivets 22 passed through the outwardly extending flanges 17 and 18 and corresponding flanges 23 and 24, on the brace.

With the ends of the cross bar attached to the upper flanges 11 of the side bars A and B as shown, the other ends of the braces D extend downwardly and outwardly, with the gussets at their outer ends in engagement with the lower flanges 12 of the side bars, and are secured thereto by rivets 25, or otherwise, passed through both the gussets and the flanges 12. By means of this construction, a strong connection is effected between the ends of the cross bar and its attached braces, and the opposite side bars of the frames.

I have found it convenient to employ the rivets 25 which connect the outer ends of the braces D to the lower flanges 12 of the side bars, as a means in part for uniting spring hangers 26 to the side bars, so as to provide additional support for the spring hangers. These spring hangers are drawn from sheet metal of suitable gauge. They have spaced down turned ears for receiving between them the eye of a spring, and upturned portions 27 adapted to engage the outer side of the side bar and to be riveted to the web 10 thereof, thus making a rigid connection between the parts, and relieving the lower flanges of the side bars from the strains resulting from unsupported connections for the spring hangers.

The construction shown in Figs. 4 to 6 reverses the arrangement shown in Figs. 1 to 3, and involves mainly the attachment of the integral gussets 28 of a channel cross bar E, to the lower flanges 12 of the opposite side bars A and B, the braces F being arranged at the top of the cross bar, with the outer ends of the braces attached to the upper flanges 11 of the side bars. In Figs. 4 to 6 the braces F, formed as channels as before, are arranged at their inner ends to overlie and embrace the top and sides of the cross bar E, and interlock therewith, and are suitably secured thereto by means of rivets in the manner shown, or otherwise. In some forms of automobile frame construction, such an arrangement of the cross bars is desirable. In connection with the construction last described, I may use the rivets connecting the gussets at the ends of the cross bar to the side bars as a means in part for attaching spring hangers 29 to the side bars.

In drawing the channel cross bar, no blanking operation to produce a contour is required, inasmuch as the full width of the strip is absorbed in producing the channel cross section, and there consequently is no waste of material in the form of scrap. The elimination of the blanking operation, and the cost of the dies therefor, contributes to a great economy in the cost of production of the improved cross bar. At the same time, the amount of material in the strip from which the cross bar is produced is lessened, over that required to produce cross bars of dimensions at their ends sufficient to bridge the space between the upper and lower flanges of the side bars, so as to permit direct attachment of the cross bars to both of such flanges. The inclusion in the cross bar of material which heretofore has been cut away in the blanking operation, contributes to an increase in the strength of the cross bar, and the manner of connecting the parts, endows the frame with a greater degree of stability, rendering it less responsive to twisting and racking strains.

The cross bars may be arcuate, as shown, or straight, to meet the requirements of the particular vehicle in which the frame is incorporated.

Having thus described my invention what I desire to secure by Letters Patent of the United States, is:

1. In a frame for automobiles or other vehicles, a cross bar having gussets at its ends, a pair of oppositely arranged channel side bars to one flange of each of which one of said gussets is attached, and braces attached to the cross bar intermediate the gussets, the outer ends of the braces being attached to the other flanges of the side bars.

2. In a frame for automobiles or other vehicles, a cross bar having integral gussets at its ends and a channel formation intermediate such ends, a pair of channel side bars to one flange of each of which one of the said gussets is attached, and channel braces having at their inner ends an interlocking engagement with the channel cross bars, the outer ends of the braces being attached to the other flanges of the side bars.

3. In a frame for automobiles or other vehicles, a cross bar having wide integral gussets at its ends and a channel formation intermediate such ends, a pair of channel side bars to the upper flanges of which the said gussets are attached, and channel braces having at their inner ends an interlocking engagement with the channel cross bars, the outer ends of the braces being attached to the lower flanges of the side bars.

4. In a frame for automobiles or other vehicles, a pair of oppositely arranged channel side bars, a cross bar having gussets at its ends and an intermediate channel formation, the gusset at each end of the cross bar being attached to one of the flanges on the adjacent side bar, and channel braces having at their inner ends an interlocking engagement with the channel cross bar and attached thereto, the outer ends of the braces being attached to the other flanges of the side bars, to stabilize the frame structure.

5. In a frame for automobiles or other vehicles, a pair of oppositely arranged channel side bars, a cross bar having integral wide and flat gussets at its ends and an intermediate channel formation, the gusset at each end of the cross bar being attached to one of the flanges on the adjacent side bar, and channel braces having at their inner ends an interlocking engagement with the channel cross bar and attached thereto, the outer ends of the braces being attached to the other flanges of the side bars, to stabilize the frame structure.

6. In a frame for automobiles or other vehicles, a pair of oppositely arranged channel side bars, a cross bar having integral wide and flat gussets at its ends and an intermediate channel formation, the gusset at each end of the cross bar being attached to one of the flanges on the adjacent side bar, and channel braces superposed upon the cross bar and having at their inner ends an interlocking engagement with the channel cross bar and attached thereto, the outer ends of the braces being attached to the other flanges of the side bars, to stabilize the frame structure.

7. In a frame for automobiles or other vehicles, a pair of oppositely arranged channel side bars, a cross bar having integral wide and flat gussets at its ends and an intermediate channel formation, the gussets at the ends of the cross bar being attached to the upper flanges on the side bars, and channel braces having their inner ends superposed upon and embracing the channel cross bar and attached thereto, the outer ends of the braces being attached to the lower flanges of the side bars, to stabilize the frame structure.

8. In a frame for automobiles and other vehicles, a cross bar having integral gussets at its ends and a channel formation intermediate such ends, a pair of opposed channel side bars to one flange of which the said gussets are attached, and connections between the cross bar and the other flanges of the side bars.

9. In a frame for vehicles, a pair of opposed channel side bars, a cross bar having a channel section intermediate its ends, and having its end portions flattened to form integral gussets, said gussets being attached to one flange of the respective adjacent side bars, and connecting means between said intermediate channel section and the opposite flanges of said channel side bars.

10. In a frame for vehicles, a pair of opposed channel side bars, a channel cross bar spacing said side bars, said cross bar having its end portions formed into integral gussets, each gusset being attached to one flange of the adjacent channel side bar, and braces connecting the other flange of said side bars to said cross bar.

11. In a frame for vehicles, a pair of channel side bars, a channel cross bar spacing said channel side bars, said cross bar having outwardly extending web portions at each side of said channel, integral gussets at each end of said cross bar, each gusset being attached to one flange of the adjacent side bar, and bracing means connecting the other flange of said side bars with said cross bar, said bracing means being attached to the bottom of said channel in said cross bar, and to the web portions of said cross bar.

12. In an automobile frame, a sheet metal cross bar comprising horizontal flat end sections connected by an intermediate channel section integral therewith and providing gussets for attachment to the side bars of the frame, and braces adapted to connect said intermediate channel section to the side bars.

13. In an automobile frame, a sheet metal cross bar comprising an intermediate channel section and flat end sections integral therewith and providing gussets for attachment to the side bars of the frame, the end sections lying substantially in the longitudinal plane of the cross bar, and channel braces having at their inner ends an interfitting engagement with the channel section of the cross bar and attached at their outer ends to the side bars.

In testimony whereof I have signed my name at Milwaukee, Wisconsin, this 19th day of October, 1927.

B. T. ANDREN.